United States Patent
Xia et al.

(10) Patent No.: US 7,956,143 B1
(45) Date of Patent: Jun. 7, 2011

(54) TOUGHENED TWO-PART ADHESIVE COMPOSITIONS DEMONSTRATING IMPROVED IMPACT AND/OR PEEL STRENGTHS WHEN CURED

(75) Inventors: Bo Xia, Burlington, MA (US); James Murray, Newmarketr, NH (US); Charles Schuft, Boxborough, MA (US)

(73) Assignee: Henkel Corporation, Rocky Hill, CT (US)

( * ) Notice: Subject to any disclaimer, the term of this patent is extended or adjusted under 35 U.S.C. 154(b) by 670 days.

(21) Appl. No.: 11/107,757

(22) Filed: May 23, 2005

(51) Int. Cl.
*C08F 118/02* (2006.01)
*C08F 36/00* (2006.01)
*C08F 20/06* (2006.01)
*C08F 2/44* (2006.01)
*C08F 214/06* (2006.01)
*C08F 2/08* (2006.01)

(52) U.S. Cl. ............. 526/319; 526/335; 526/317.1; 524/849; 524/851; 524/852

(58) Field of Classification Search .......... 526/319, 526/335, 317.1; 524/849, 851, 852
See application file for complete search history.

(56) References Cited

U.S. PATENT DOCUMENTS

| | | | | |
|---|---|---|---|---|
| 3,041,322 | A | 6/1962 | Kriebel | 260/89.5 |
| 3,046,282 | A | 7/1962 | Buckwalter | 260/314.5 |
| 3,203,941 | A | 8/1965 | Kriebel | 260/89.5 |
| 3,218,305 | A | 11/1965 | Kriebel | 260/89.5 |
| 3,591,438 | A | 7/1971 | Kriebel | 156/310 |
| 3,925,988 | A | 12/1975 | Kelley | 60/539 |
| 4,309,526 | A | 1/1982 | Baccei | 528/75 |
| 4,503,189 | A * | 3/1985 | Igarashi et al. | 525/104 |
| 6,433,091 | B1 * | 8/2002 | Cheng | 525/191 |

OTHER PUBLICATIONS

Product literature, Stochem, K-Flex XM-B301 (2003).*

* cited by examiner

*Primary Examiner* — William K Cheung
(74) *Attorney, Agent, or Firm* — Steven C. Bauman

(57) ABSTRACT

Compositions for bonding substrate surfaces, particularly steel, aluminum, and urethane-primed galvanized steel, are disclosed. Desirably, the compositions include a stable emulsion including: (a) at least one curable (meth)acrylate component; (b) at least three different elastomeric polymers that are soluble and/or partially soluble in the (meth)acrylate component; and (c) optionally at least one elastomeric polymer that is not soluble in the (meth)acrylate component. Methods for preparing and methods for using these compositions also are disclosed.

17 Claims, 4 Drawing Sheets

US 7,956,143 B1

TOUGHENED TWO-PART ADHESIVE COMPOSITIONS DEMONSTRATING IMPROVED IMPACT AND/OR PEEL STRENGTHS WHEN CURED

FIELD OF THE INVENTION

The present invention relates to adhesive compositions for bonding substrate surfaces. The present invention also relates to methods for preparing the aforementioned compositions and methods of using such compositions.

BRIEF DESCRIPTION OF RELATED TECHNOLOGY

Commercial vehicles, particularly commuter vehicles such as school buses, must exhibit extraordinary strength and impact resistance to help ensure the safety of passengers. Accordingly, structural adhesives used to bond different parts of a commercial vehicle's chassis (such as the body, roof, and floor panels) must exhibit exceptional impact and bond strength.

In addition to high impact and bond strength, it is desirable that such adhesives exhibit high peel. Moreover, it is desirable that such structural adhesives be easy to apply to substrate surfaces, resist sag upon application, and exhibit a long open time wherein the adhesive remains uncured to allow for the assembly of the desired product.

The incorporation of toughening agents in the resin matrix of a structural adhesive to impart toughness therein is common practice (see, e.g., U.S. Pat. No. 6,433,091). Notwithstanding the state of the art, however, there remains a need for structural adhesives that exhibit high tensile strength, high impact resistance, and high peel strength while resisting sag upon application and exhibiting a long open time. The present invention provides such structural adhesive compositions.

SUMMARY OF THE INVENTION

In one aspect of the invention, there is provided an adhesive composition including a stable emulsion including: (a) at least one curable (meth)acrylate component; (b) at least three different elastomeric polymers that are soluble and/or partially soluble in the (meth)acrylate component; and (c) optionally at least one elastomeric polymer that is not soluble in the (meth)acrylate component.

In another aspect of the invention, there is provided a method for preparing a composition for bonding substrate surfaces including the steps of: (a) forming an emulsion including: (i) at least one curable (meth)acrylate component and (ii) at least three different elastomeric polymers that are soluble and/or partially soluble in the (meth)acrylate component and (b) optionally admixing at least one elastomeric polymer that is not soluble in the (meth)acrylate component with the emulsion.

In still another aspect of the invention, there is provided a method for using a composition to bond together two substrates, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wherein the composition includes a stable emulsion including: (a) at least one curable (meth)acrylate component; (b) at least three different elastomeric polymers that are soluble and/or partially soluble in the (meth)acrylate component; and (c) optionally at least one elastomeric polymer that is not soluble in the (meth)acrylate component.

In yet another aspect of the invention, there is provided a composition including the reaction product of: (a) a first part including: (i) at least one curable (meth)acrylate component and (ii) at least three different elastomeric polymers that are soluble and/or partially soluble in the (meth)acrylate component and (b) a second part optionally including at least one elastomeric polymer that is not soluble in the (meth)acrylate component.

In still another aspect of the invention, there is provided an article of manufacture including at least two substrate surfaces bonded together with a composition, wherein the composition includes a stable emulsion including: (a) at least one curable (meth)acrylate component; (b) at least three different elastomeric polymers that are soluble and/or partially soluble in the (meth)acrylate component; and (c) optionally at least one elastomeric polymer that is not soluble in the (meth)acrylate component.

DETAILED DESCRIPTION OF THE INVENTION

Figure 1:
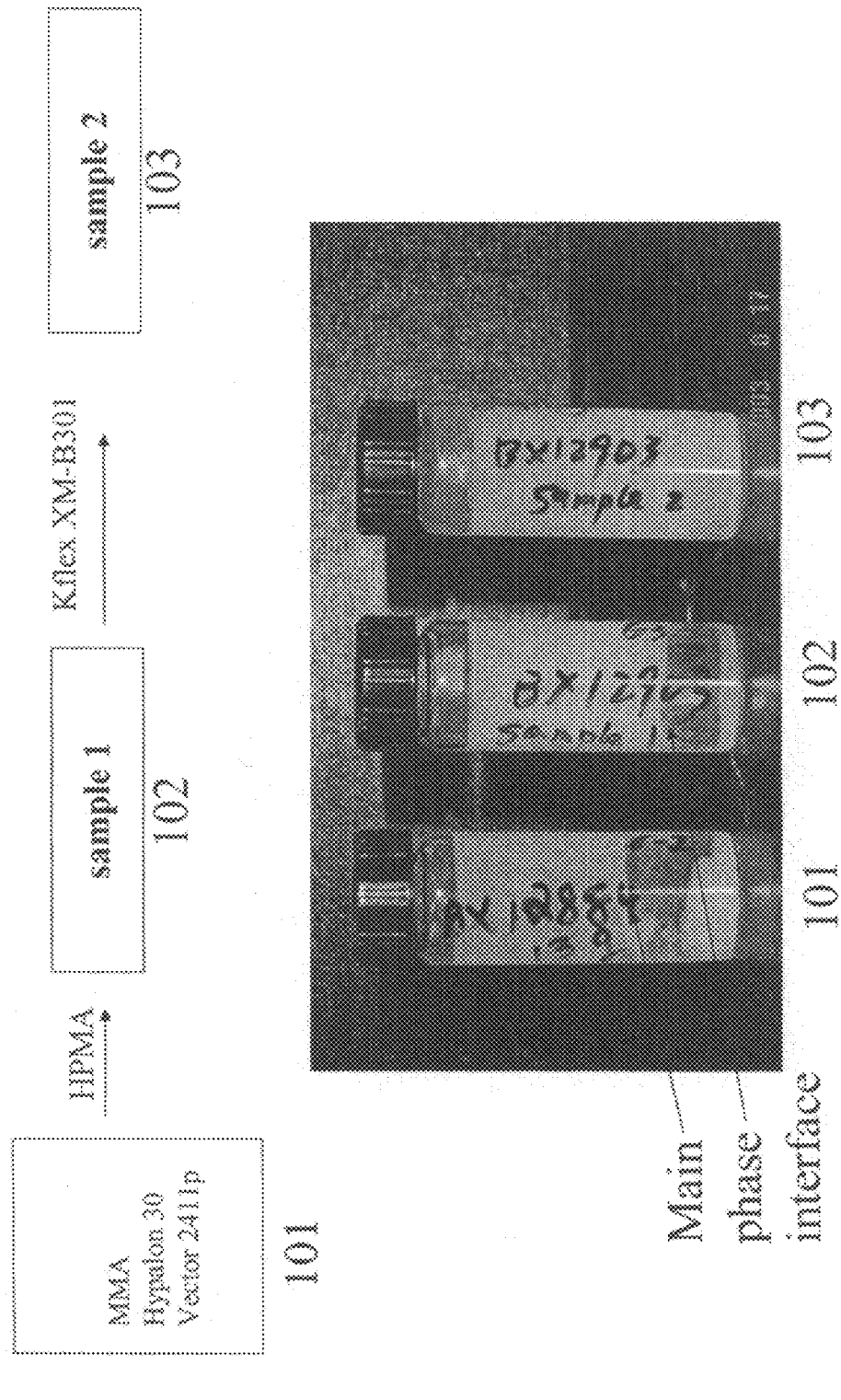
FIGS. 1 and 2 are photographs that illustrate: (i) how a phase interface exists between two elastomeric polymers that are incompatible and/or partially soluble in (meth)acrylate when those elastomeric polymers are placed in a vial containing (meth)acrylate and (ii) how the addition of a urethane polyol to the vial eliminates the phase interface and results in the formation of a homogenous emulsion at room temperature.

The present invention is directed to compositions for bonding substrate surfaces. The present invention also relates to methods for preparing the aforementioned compositions and methods of using such compositions.

The present invention is predicated upon the unexpected finding that a urethane polyol will stably emulsify elastomeric polymers that are incompatible in a resin component such as a (meth)acrylate component. By "elastomeric polymers that are incompatible in a resin component" is meant elastomeric polymers that are separated by a phase interface when miscible in a resin component such as a (meth)acrylate component. For example, it is well-known that selected vinyl-terminated butadiene and polychlorosulfonated polyethylene are not compatible in methyl methacrylate and, as such, will exist in methyl methacrylate in phases that are separated by a phase interface. Moreover, it is well-known that selected styrene butadiene styrene compositions and polychlorosulfonated polyethylene are not fully compatible in all concentrations of methyl methacrylate or its solutions and, as such, will be present in methyl methacrylate in phases that are separated by a phase interface. As used herein, "elastomeric polymers that are compatible in a resin component" are elastomeric polymers that are not separated by a phase interface when miscible in a resin component such as methyl methacrylate.

The present invention also is predicated upon the unexpected finding that elastomeric polymers that are insoluble in a resin component (such as a (meth)acrylate component) can be stably dispersed within a stable emulsion of elastomeric polymers that are soluble in that same resin component to form adhesive compositions that exhibit high strength, high impact resistance, and high peel strength while resisting sag upon application and exhibiting a long open time. Moreover, the present invention is further predicated upon the unexpected finding that the inclusion of a urethane polyol in such compositions will impart enhanced stability and strength to such compositions.

The present inventive compositions can include two parts, i.e., a first part and a second part. In particular, the present inventive compositions can be formulated to include (a) a first part that includes (i) at least one curable (meth)acrylate component, (ii) at least one elastomeric polymer that is soluble and/or partially soluble in the (meth)acrylate component, and (iii) optionally at least one elastomeric polymer that is insoluble in the (meth)acrylate component and (b) a second part that includes (i) at least one (meth)acrylate component and (ii) optionally at least one elastomeric polymer that is insoluble in the (meth)acrylate component. Desirably, the first part of such compositions includes (i) at least three elastomeric polymers that are soluble in the (meth)acrylate component, wherein the elastomeric polymers can include both elastomeric polymers that are incompatible in a resin component such as a (meth)acrylate component and elastomeric polymers that are compatible in a resin component such as a (meth)acrylate component, and (ii) at least one urethane polyol.

Moreover, the present compositions can be formulated to include (a) a first part that includes at least one (meth)acrylate component and elastomeric polymers, wherein the elastomeric polymers can include both elastomeric polymers that are incompatible in a resin component such as (meth)acrylate component and elastomeric polymers that are compatible in a resin component such as (meth)acrylate component, and (b) a second part that does not include a (meth)acrylate component and any elastomeric polymers. Desirably, the first part of such compositions includes (i) at least three elastomeric polymers that are soluble in the (meth)acrylate component, wherein the elastomeric polymers can include both elastomeric polymers that are incompatible in a resin component such as (meth) acrylate component and elastomeric polymers that are compatible in a resin component such as (meth)acrylate component, (ii) at least one elastomeric polymer that is insoluble in a (meth)acrylate component, and (iii) at least one urethane polyol. Moreover, it is desirable to include at least one epoxy resin component in the second part of such compositions.

Any suitable elastomeric polymer can be used in the present inventive compositions, including those elastomeric polymers known in the art to be soluble in a resin such as a (meth)acrylate monomer and those elastomeric polymers known in the art to be insoluble in a resin such as a (meth) acrylate monomer. Suitable elastomeric polymers include, for example, prereacted particles of polyacrylate, styrene/butadiene/styrene (SBS) copolymers, styrene/isoprene/styrene (SIS) copolymers, styrene/butadiene (SBR) copolymers, and the like.

Any suitable prereacted elastomeric rubber can be incorporated in the present inventive compositions to impart toughness to the compositions. A partial listing of useful prereacted elastomeric rubbers includes, for example, prereacted elastomeric particles selected from the group consisting of acrylate-butadiene, butadiene, chloroprene, ethylene-propylene, ethylene-propylene-diene, isoprene, isobutylene, isobutylene-isoprene (butyl rubber), styrene-butadiene, styrene-isoprene, acrylonitrile-butadiene, acrylonitrile-chloroprene, vinylpyridine-butadiene, vinylpyridine-styrene-butadiene, carboxylic-styrene-butadiene, chloroisobutylene-isoprene (chlorobutyl rubber), bromoisobutylene-isoprene (bromobutyl rubber), dialkysiloxane, poly(propylene oxide), polyesterurethanes, polyetherurethanes, and mixtures thereof. Nitrile rubber powders, such as Chemigum P83 (available from Goodyear) are particularly suitable toughening agents. Moreover, any of the rubbers set forth in U.S. Pat. No. 6,433,091, which is incorporated herein by reference, can be included in the present inventive compositions.

Reactive liquid polymers (RLPs) also can be incorporated in the present inventive compositions to impart toughness to the compositions. RLPs contain functional groups, usually on their terminal ends but occasionally as pendant groups, and react with the resin in situ to form elastomeric domains. Examples of RLPs include, without limitation, carboxy-terminated butadiene nitrile (CTBN), amine-terminated butadiene nitrile (ATBN), hydroxy-terminated butadiene nitrile (HTBN), epoxy-terminated butadiene nitrile (ETBN), mercapto-terminated butadiene nitrile (MTPN), and phenoxy-terminated butadiene nitrile (PTBN). T-5000 adducts also can be used as toughening components.

Particularly useful elastomeric polymeric polymers that are soluble in a (meth)acrylate component include, for example, vinyl-terminated liquid rubbers known in the art, including liquid polybutadienes and/or liquid polyisoprenes and/or copolymers thereof, any known block copolymer rubber, including block copolymers of either butadiene or isoprene, and chlorosulfonated polyethylenes.

Particularly useful vinyl-terminated liquid rubbers that are soluble in a (meth)acrylate component include, for example, those commercially available from BF Goodrich under the series tradename Hycar, and/or from Sartomer/Ricon, under the tradename Ricacryl. Desirably, the vinyl-terminated butadiene rubber sold under the tradename Hycar VTB 2000X168 is incorporated in the present inventive compositions.

Particularly useful block copolymers include, for example, butadiene block copolymers, such as those commercially available from Dexco under the tradename Vector, and from Shell Chemical, under the series tradename Kraton. Desirably, the styrene butadiene styrene block copolymer sold under the tradename Vector 2411P is incorporated in the present inventive compositions.

Particularly useful chlorosulfonated polyethylenes include, for example, chlorosulfonated polyethylenes represented by the structure:

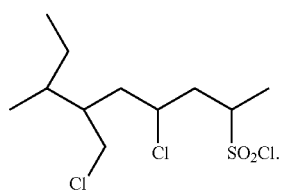

Desirably, the present inventive compositions include, for example, Hypalon 20 and/or Hypalon 30 (which are sold by E.I. DuPont Nemours, Wilmington, Del.).

As discussed above, any elastomeric polymer that is insoluble in a (meth)acrylate component also can be included in the present inventive compositions. A particularly useful elastomeric polymer that is insoluble in (meth)acrylate monomer is, for example, acrylonitrile-butadiene-styrene, which is commercially available as a powder from GE Plastics under the tradename Blendex 338, and from Rohm and Haas under the tradename Paraloid.

The useful total amount of elastomeric polymers in the present inventive compositions typically ranges from about 5 percent by weight of the total composition at the low end to about 60 percent by weight of the total composition. As used herein, the phrase total composition refers to a composition having a first part and a second part.

The useful total amount of elastomeric polymers that are soluble and/or partially soluble in the (meth)acrylate component typically ranges from about 5 percent by weight of the total composition to about 70 percent by weight of the total compositions. Where at least three different elastomeric polymers that are soluble each by themselves to some level in the (meth)acrylate component are incorporated in the present inventive compositions, the at least three different elastomeric polymers are desirably present in a combined amount from about 5 percent by weight to about 30 percent by weight of the total composition. Moreover, it is useful to incorporate each elastomeric polymer that is soluble in the (meth)acrylate component in an amount from about 1 percent by weight to about 20 percent by weight of the total composition.

The useful total amount of elastomeric polymers that are insoluble in the (meth)acrylate component typically ranges from about 1 percent by weight of the total composition to about 30 percent by weight of the total composition. With respect to the two-part compositions that contain a (meth)acrylate component in both parts, it is advantageous to include, in each part, at least one elastomeric polymer that is insoluble in (meth)acrylate component in an amount from about 0 percent by weight to about 50 percent by weight of the total composition. Moreover, with respect to the two-part compositions that contain a (meth)acrylate component only in the first part, it is advantageous to include at least one elastomeric polymer that is insoluble in the (meth)acrylate in the first part in an amount from about 1 percent by weight to about 30 percent by weight of the total composition.

Desirably, elastomeric polymers are incorporated in the present inventive compositions in an amount sufficient to yield compositions having a peel strength on a substrate of at least about 65 pli at room temperature, wherein the compositions are cured for two hours at room temperature and then for 30 minutes at 220° F. and then cooled to room temperature, or cured at room temperature ~25° C. prior to measuring the peel strength. In particular, when the substrate is acid-etched aluminum, the elastomeric polymers are desirably incorporated in the present inventive compositions in an amount sufficient to yield compositions having a peel strength on acid-etched aluminum of at least about 90 pli at room temperature, wherein the compositions are cured for two hours at room temperature and then for 30 minutes at 220° F. and then cooled to room temperature prior to measuring the peel strength.

Moreover, the elastomeric polymers are desirably incorporated in the present inventive compositions in an amount sufficient to yield compositions that exhibit a tensile strength on a substrate of at least about 2400 psi at 72° F., wherein the compositions are cured for two hours at room temperature and then for 30 minutes at 220° F. and then cooled to 72° F. prior to measuring the tensile strength, or when cured 1 to 3 days at room temperature (typically ~25° C. or so).

Additionally, the elastomeric polymers are desirably incorporated in the present inventive compositions in an amount such that the compositions withstand an impact of at least about 29 KJ/m$^2$ when measured at −40° F., wherein the composition is cured for two hours at room temperature and then for 30 minutes at 220° F. and then cooled to −40° F. prior to measuring the amount of impact that can be withstood using a General Motors certified Charpy side impact tester in accordance with side impact test GM 9751P at −40° F.

Any suitable (meth)acrylate component or (meth)acrylate components can be incorporated in the present inventive compositions. Useful (meth)acrylate components can be chosen from a wide variety of materials represented by the following formula:

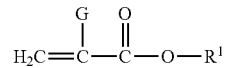

where G may be hydrogen, halogen or alkyl of 1 to about 4 carbon atoms, and R$^1$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone, and the like.

Additionally, useful (meth)acrylate components can be chosen from the alkylene polyol polyacrylates having the general formula:

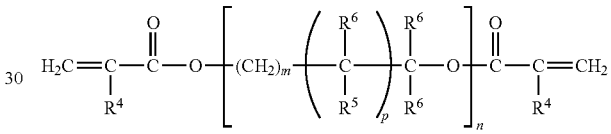

where R$_4$ is selected from the group consisting of hydrogen, halogen, and lower alkyl of 1-4 carbon atoms; R$_5$ is selected from the group consisting of hydrogen, —OH,

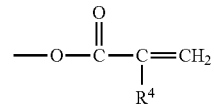

and

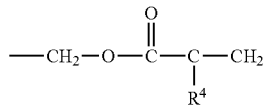

R$_6$ is a radical selected from the group consisting of hydrogen, lower alkyl of 1-4 carbon atoms, hydroxyalkyl of 1-4 carbon atoms, and m is an integer equal to at least 1, desirably 1-8 and more desirably from 1 to 4; n is an integer equal to at least 1, desirably, 1 to 20; and p is 0 or 1.

Typical of these monomers are mono-, di-, tri- tetra- and polyethylene glycol dimethacrylate and the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

Particularly useful polymerizable crosslinkable components that can be used as the (meth)acrylate component are ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth) acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth) acrylate, ethoxylated bisphenol A di(meth)acrylate and combinations thereof.

Various useful urethane-acrylate monomers, such as those described in U.S. Pat. No. 3,925,988 to Gorman, and U.S. Pat. No. 4,309,526 to Baccei, each of which are incorporated herein by reference, also may be used as the (meth)acrylate component. The monomers disclosed in the '526 patent may be viewed as one-component polymerizable block copolymers (prepolymers) having rigid and flexible segments. This is achieved by the chemical linking of precursor "prepolymers" which are subsequently "capped" with (meth)acrylate functionality.

Moreover, acrylates derived from bisphenol-A, such as bisphenol-A dimethacrylate, hydrogenated bisphenol-A dimethacrylate, and ethoxylated bisphenol-A dimethacrylate also may be used as the (meth)acrylate component.

Furthermore, while di- and other polyacrylate esters have been found particularly desirable, monofunctional acrylate esters (esters containing one acrylate group) also may be used as the (meth)acrylate component. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

Other unsaturated reactive diluents, such as styrene and acrylonitrile, also can be used. When used, the concentration of such diluents should be less than about 60 percent by weight, and preferably about 10 to about 40 percent by weight of the total composition. As used herein, the phrase total composition refers to a composition having a first part and a second part.

Particularly useful curable (meth)acrylate components for use in the present inventive compositions are methyl methacrylate and MHORMER BM-905 (hydroxy ethyl methacrylate monomer (HEMA)).

The useful amount of (meth)acrylate component typically ranges from about 20 percent by weight to about 90 percent by weight of the total composition. Desirably, the present inventive compositions contain from about 40 percent by weight to about 60 percent by weight of methyl methacrylate and from about 0 percent by weight to about 15 percent by weight of HEMA.

Moreover, the present inventive compositions can include any suitable curable epoxy resin component. For example, with respect to the two-part compositions that do not include a (meth)acrylate component in the second part, it is desirable to include an epoxy resin component in the second part. Room temperature cure and elevated temperature cure epoxies are useful.

Epoxy resins suitable for use in the compositions of the present invention include polyepoxides curable by elevated temperature. Examples of these polyepoxides include polyglycidyl and poly(β-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcinol, quinitol, bis(4-hydroxycyclohexyl)methane, 2,2-bis(4-hydroxycyclohexyl) propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino) diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrabis(4-hydroxyphenyl)ethane, 2,2,-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenols substituted in the ring by chlorine, bromine, and/or halogen atoms or by alkyl groups each containing up to nine carbon atoms, such as 4-chlorophenol, 2-methylphenol, and 4-t-butylphenol.

Poly(N-glycidyl) compounds include, for example, those obtained by dehydrochlorination of the reaction products of epichlorohydrin with amines containing at least two aminohydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycydyloxy-1,3-bi s(5,5-dimethyl-1-glycidylhydanto in-3-yl)propane.

Useful epoxies are available from a variety of commercial sources, such as the EPON series from Shell Chemical Co., the EPI-REZ series formerly from Rhone-Poulenc, the ARALDITE series from Vantico, Inc., the DER and DEN series from Dow Chemical Co., the EPOTUF series from Reichhold, the GLYAMINE series from F.I.C. Corporation, PGA-X and PGA-C from the Sherwin-Williams Co, BREN-S from Nippon Kayaku, SU-8 from Interez, Inc., and ERL-4221 from Union Carbide Co. In this regard, a particularly useful epoxy is EPON 828, which is available from Shell Chemical Co.

Also useful are halogenated epoxy resins such as brominated epoxides. Moreover, various epoxies such as the glycidyl ethers marketed as the EPODIL series by Pacific Anchor Chemical Corporation, a division of Air Products and Chemicals Inc., may be added as epoxy diluents, to reduce the viscosities of the resins of the present invention.

Other optional epoxy compounds may be present which have both epoxy functionality and olefinically unsaturated functionality ("dual-functional" resins).

The curable or non-curable epoxy resin component can be present in any suitable amount. Useful amounts of epoxy resin component typically range from about 0 percent by weight to about 20 percent by weight of the total composition. Desirably, the epoxy resin component is present in an amount from about 1 percent by weight to about 5 percent by weight of the total composition.

The present inventive compositions can include any suitable urethane polyol stabilizer known in the art, such as urethane polyols sold under the tradename K-flex. As demonstrated in the photographs set forth herein, the addition of a urethane polyol to a composition containing at least two polymers that are incompatible in a (meth)acrylate component results in the creation of a stable, homogenous emulsion. Moreover, it is desirable to add a urethane polyol to a composition containing at least three elastomeric polymers that are soluble and/or partially soluble in a (meth)acrylate component, wherein at least two of the elastomeric polymers are incompatible in the (meth)acrylate component to some degree. Upon addition of a urethane polyol, either hydroxy capped, or acetyl acetonate (AcAc) capped, to such a composition, a homogenous, stable emulsion will be formed. Further to the use of AcAc esters, urethane and non-urethane, these materials will extend the open time of the present inventive compositions, while at the same time accelerating the development of properties, such as strength, after the longer open time is over.

The compositions of the present invention can include any suitable phosphate ester. Suitable phosphate esters for use in the present invention include those represented by the formula:

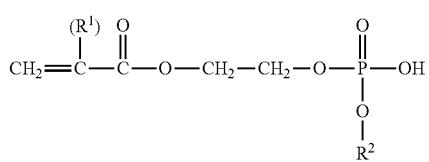

where $R^1$ is H or $CH_3$, and $R^2$ is H, and wherein $R^2$ can additionally include:

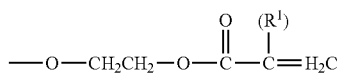

where $R^1$ is H or $CH_3$. A particularly useful phosphate ester for use in the present invention is HEMA phosphate ester, which is sold under the tradename T-MULZ, and which is commercially available from Arcros Chemicals, Inc.

Useful amounts of phosphate ester component typically range from about 0 percent by weight to about 8 percent by weight of the total composition.

A number of well-known initiators of free radical polymerization may be incorporated in the present inventive compositions as the free-radical initiator component. Peroxides and peresters are particularly useful. For example, suitable initiators of free radical polymerization include, without limitation, cumene hydroperoxide (CHP), paramenthane hydroperoxide, tertiary butyl hydroperoxide (TBH), tertiary butyl perbenzoate (TBPB), and benzoyl peroxide (BPO). The useful amounts of free-radical initiator component typically range from about 0.1 percent by weight to about 5 percent by weight of the total composition.

Various accelerator compounds, such as tertiary amines, imides, polyamines, cyclicamines, and arylamines can be included in the compositions of the present invention to further increase cure speeds and completion of cure. See, e.g., U.S. Pat. No. 3,041,322 (tertiary amines), U.S. Pat. No. 3,046,282 (imides), U.S. Pat. No. 3,203,941 (polyamines), U.S. Pat. No. 3,218,305 (cyclic and arylamines), and U.S. Pat. No. 3,591,438, all to Kriebel, the disclosures of which are all incorporated herein by reference.

Other useful accelerators for the present invention include compounds having the following formula:

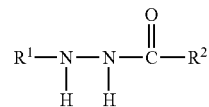

where $R^1$ is selected from alkyl from 2 to 6 carbon atoms, cycloalkyl, aryl, alkenyl, and cycloalkenyl and $R^2$ is selected from hydrogen, alkyl, cycloalkyl, alkenyl and cycloalkenyl, aryl, alkoxy, aryloxy, carbonyl, amino, and the following groups:

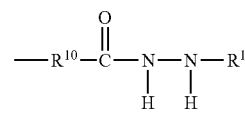

and

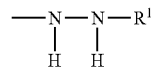

where $R^{10}$ is selected from alkyl groups containing one to about 10 carbon atoms, alkenyl groups containing two to about 10 carbon atoms, and aryl groups containing up to about 10 carbon atoms. Examples of useful accelerator compounds include 1-acetyl-2-phenyl hydrazine, 1-acetyl-2(p-tolyl) para-toluene sulfonyl hydrazide, 1-formyl-2-phenyl hydrazine and combinations thereof.

Particularly useful accelerators that can be incorporated in the present inventive compositions include pyridine derivatives having the formula:

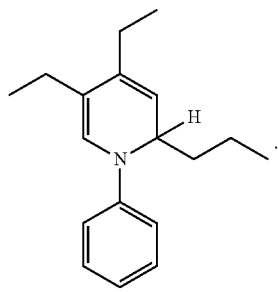

One particularly useful pyridine derivative is sold under the tradename REILLCAT ASY-2.

The useful amounts of accelerator typically range from about 0 percent by weight to about 8 percent by weight of the total composition. Desirably, at least one accelerator is present in an amount from about 2 percent by weight to about 4 percent by weight of the total composition.

With respect to the present inventive two-part compositions that include a (meth)acrylate component in both parts, it is advantageous to include at least one free radical initiator component in the first part and at least one accelerator in the second part, such as the commercially available REILLCAT ASY-2 (phenyl dihydropyridine (PDHP)). Moreover, it also is advantageous to include a free radical initiator component in the second part of the two-part compositions that do not contain (meth)acrylate component in the second part.

Any suitable catalyst for the free radical component also can be included in the present inventive compositions. Suitable catalysts for the free-radical initiator component include phenyl dihydropyridine (PDHP), butyl dihydropyridine (BDHP), transition metals, such as copper, cobalt, magnesium, vanadium, manganese, iron, and salts and complexes thereof, saccharin, and alkylated aromatic amines, such as dimethyl p-toluidine (DMT), dimethyl o-toluidine, N,N-Bis hydroxyethyl p-toluidine (HEPT or TMD), N,N-Bishydroxypropyl p-toluidine (HPPT), and derivatives of alkylated aromatic amines. Metal salt solutions such as copper salt solutions also are useful. More particularly, acetyl acetone metal complexes such as 2,4-pentane dione/copper complexes and naphthenate/copper complexes are useful, and may be pre-dissolved in methyl methacrylate (MMA) or similar monomer or composition liquid. For example, the commercially available IM2231 (copper naphthenate in methyl methacrylate) can be pre-prepared and included in the present inventive compositions.

With respect to the present inventive two-part compositions that include a (meth)acrylate component in both parts, it is advantageous to include at least one free radical initiator in the first part and a catalyst for the free radical initiator in the second part. Desirably, the free radical initiator incorporated in the first part is TBPB, CHP, or a combination thereof, and the catalyst incorporated in the second part is DMT, TMD, PDHP, BDHP, a copper or metal complex or any combination thereof.

With respect to the present inventive two-part compositions that contain a first part containing at least one free radical initiator and at least one catalyst, the ratio of the total amount of peroxide to the total amount of catalyst can be any suitable ratio. Suitable ratios of peroxide to catalyst include, for example, 1:10 to 1,000,000:1.

Any suitable carrier component can be used in the present inventive compositions. The primary purpose of the carrier component is to serve as a vehicle for the accelerator, catalyst or free-radical initiator component. Suitable carrier components include, for example, reactive resins and non-reactive resins. Desirably, the reactive resin is a (meth)acrylate resin or an epoxy resin.

Any suitable organic acid component can be used in the present invention. Suitable organic acids include, for example, carboxylic acids. Suitable carboxylic acids include, for example, methacrylic acid, maleic acid, acrylic acid, fumeric acid, and acid derivatives of acrylic and methacrylic acid, such as beta carboxy ethyl acrylic acid (BCEA), and other carboxylic acids and derivatives thereof that would be known to one of ordinary skill in the art. A particularly useful organic acid that can be incorporated in the present inventive compositions is methacrylic acid.

The useful amounts of organic acid typically range from about 0 percent by weight to about 20 percent by weight of the total composition. Desirably, the organic acid is present in an amount of at least about 1 percent by weight of the total composition and, more desirably, about 1 percent by weight to about 5 percent by weight of the total composition.

Desirably, methacrylic acid is present in an amount from about 0 percent by weight to about 15 percent by weight of the total composition. More desirably, methacrylic acid is present in an amount from about 1 percent by weight of the total composition to about 5 percent by weight of the composition.

Any suitable antioxidant can be included in the present inventive compositions. Particularly useful antioxidants are phenolic antioxidants, such as Naugard BHT and hydroquinone. Useful amounts of antioxidants typically range from about 0.001 percent by weight to about 5 percent by weight of the total composition. Desirably, antioxidants are present in an amount of from about 0.05 percent by weight to about 3 percent by weight of the total composition.

Any suitable thixotrope can be included in the present inventive compositions. Suitable thixotropic agents include, for example, Disparlon 6100, Disparlon 6200, and Disparlon 6500 (each of which being a folyamide, and commercially available as a non-reactive free flowing powder under the tradename DISPARLON 6200, from King Industries Specialties Company, Norwalk, Conn.) organo clay, and urea-urethanes, hydroxy-, amine- or amide-modified aliphatic hydrocarbons (such as castor oil-based rheological additives), polyester-amide-based rheological additives, polyacrylamides, polyimides, and polyhydroxyalkylacrylates, and combinations thereof.

A more particular description of a urea-urethane includes a combination of an alkali metal cation and the reaction product of (a) a polyfunctional isocyanate and an hydroxy and an amine; or (b) a phosgene or phosgene derivative, and a compound having 3 to 7 polyethylene ether units terminated at one end with an ether group and at the other end with a reactive functional group selected from an amine, an amide, a thiol or an alcohol; or (c) a monohydroxy compound, a diisocyanate and a polyamine. When the reaction product described in (c) is employed it is generally formed by first reacting a monohydroxy compound with a diisocyanate to form a mono-isocyanate adduct, and subsequently reacting the mono-isocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described in (c) is believed to be BYK-410, from BYK-Chemie, Wallingford, Conn. BYK-Chemie describes this reaction product as a urea-urethane.

Useful isocyanates for forming the reaction product(s) of the additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanates also include polyethyl glycol ethers having 3-7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5-25}$, and alkoxylated derivatives of these monohydroxy compounds are useful.

Phosgene and phosgene derivatives, such as bischloroformates, may be used to make the reaction product of the additive (c). These compounds are reacted with a nitrogen-containing compound, such as an amine, an amide or a thiol to form the adduct. Phosgenes and phosgene derivatives may also be reacted with an alcohol to form the reaction product.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (c) of the present invention are usually present in and added to the composition with an alkali metal salt, in a solvent carrier. The solvents are desirably polar aprotic solvents in which the reaction to form the reaction product was carried out. For example, N-methylpyrrolidone, dimethylsulfoxide, hexamethylphosphoric acid triamide, N,N-dimethylformamide, N,N,N',N'-tetramethylurea, N,N-dimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a mono-isocyanate first adduct, which is subsequently reacted with a polyamine in the presence of lithium chloride and 1-methyl-2-pyrrolidone to form a second adduct. A commercially available additive of this sort is sold by BYK Chemie, Wallingford, Conn. under the tradename BYK 410. This commercially available additive is described by BYK-Chemie product literature as being a urea urethane having a minor amount of lithium chloride present in a 1-methyl-2 pyrrolidone solvent.

Amines which can be reacted with phosgene or phosgene derivatives to make the reaction product include those which conform to the general formula $R^{11}$—$NH_2$, where $R^{11}$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, may be employed. Examples include JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by:

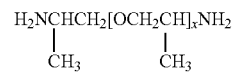

(CAS Registry No. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by:

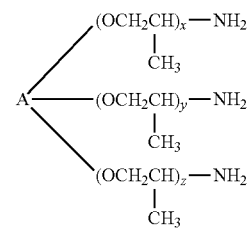

where x, y and z are set forth below in Table A.

TABLE A

| JEFFAMINE | | Approx. | Mole |
|---|---|---|---|
| Product | Initiator (A) | Mol. Wt. | % |
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE T-403 product is a trifunctional amine and may be represented by:

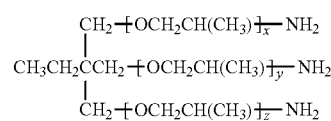

where x+y+z is 5.3. (CAS Registry No. 39423-51-3).

The JEFFAMINE ED series are polyether diamine-based products and may be represented by:

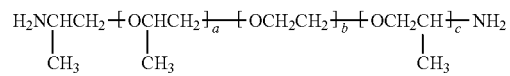

where a, b and c are set forth below in Table B.

TABLE B

| JEFFAMINE | Approx. Value | | Approx. |
|---|---|---|---|
| Product | B | A + c | Mol. Wt. |
| ED-600 | 8.5 | 2.5 | 600 |
| ED-900 | 15.5 | 2.5 | 900 |
| ED-2001 | 40.5 | 2.5 | 2,000 |

Amides useful for reacting with the phosgene or phosgene derivatives include those which correspond to the following formula:

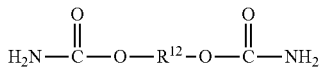

where $R^{12}$ may be an aliphatic or aromatic, substituted or unsubstituted, hydrocarbon or heterohydrocarbon, substituted or unsubstituted, having $C_{1-36}$.

Alcohols useful in forming the reaction product with the phosgene or phosgene derivatives include those described above.

Another polymeric matrix useful herein includes hydroxyl-, amine- or amide-modified aliphatic hydrocarbons and polyester-amide based rheological additives. Hydroxy-, amine- or amide-modified aliphatic hydrocarbons include THIXCIN R, THIXCIN GR, THIXATROL ST and THIXATROL GST, each of which is available from Rheox Inc., Hightstown, N.J. These modified aliphatic hydrocarbons are castor oil based materials. The hydroxyl modified aliphatic hydrocarbons are partially dehydrated castor oil or partially dehydrated glycerides of 12-hydrostearic acid. These hydrocarbons may be further modified with polyamides to form polyamides of hydroxyl stearic acid, and are described as being useful polyamides.

Polyester-amide based rheolgical additives include THIXATROL TSR, THIXATROL SR and THIXATROL VF rheological additives available from Rheox Inc., Hightstown, N.J. These rheological additives are described to be reaction products polycarboxylic acids, polyamines, alkoxylated polyols and capping agents. Useful polycarboxylic acids include sebacic acid, poly(butadiene) dioic acids, dodecane dicarboxylic acid and the like. Suitable polyamines include diamine alkyls. Capping agents are described as being monocarboxylic acids having aliphatic unsaturation.

Useful amounts of thixotropes typically range from about 0 percent by weight to about 20 percent by weight of the total composition. Desirably, a thixotrope is present in an amount from about 0.1 percent by weight to about 5 percent by weight of the total composition.

Any suitable blooming agent can be included in the present inventive compositions. A suitable blooming agent is, for example, paraffin wax. Useful amounts of wax typically range from about 0 percent by weight to about 2 percent by weight of the total composition. Preferably, wax is present in an amount from about 0.1 percent by weight to about 1 percent by weight of the total composition.

Any suitable filler can be included in the present inventive compositions. Suitable fillers include, for example, nephyline syenite, alkali metal carbonates, and silicas. Useful amounts of filler typically range from about 0 percent by weight to about 60 percent by weight of the total composition. Desirably, fillers are present in an amount from about 1 percent by weight to about 20 percent by weight of the total composition.

Other agents such as thickeners, plasticizers, elastomers, thermoplastics, coloring agents, shelf-life extenders (for example, zinc chloride), industrial microbiostats (for example, zinc Omadine® powder), surfactants or wetting agents, polymerization inhibitors, stabilizers, viscosity modifiers, adhesion promoters, corrosion inhibitors, and other well-known additives also may be incorporated where functionally desirable. Moreover, spacer beads (such as 5 mil glass beads, or 30 mil glass beads, or 30 mil plastic particles, or inert filler of desired size, and the like) also may be included to control bond line thickness.

The present inventive compositions can be applied to any suitable substrate in accordance with the present inventive methods and processes, including galvanized steel substrates. It is particularly useful to apply the present inventive compositions to galvanized steel substrates that are coated with zinc phosphate and top-coated with a 0.003" thick urethane primer (commercially available from BASF Corpoiation).

The present invention will be further understood by reference to FIGS. 1-4. FIG. 1 is a photograph of three vials labeled 101, 102, and 103, respectively, at room temperature. The first vial (101) contains (i) two elastomeric polymers that are incompatible in a (meth)acrylate component, namely, chlorosulfonated polyethylene and styrene butadiene styrene, and (ii) methyl methacrylate, all mechanically mixed together. As illustrated by the photograph, taken after the vials stood at room temperature for a period of time, a phase interface separates a phase containing chlorosulfonated polyethylene and methyl methacrylate and a phase containing styrene butadiene styrene and methyl methacrylate. The second vial (102) additionally contains hydroxypropylmethacrylate. As shown, the addition of hydroxypropylmethacrylate did not result in the emulsification of the elastomeric polymers contained in the first vial (102). The third vial (103) additionally contains a urethane polyol. As shown in FIG. 1, the addition of a urethane polyol eliminates the phase interface that is seen in the first (101) and second (102) vials and results in the formation of a homogenous emulsion at room temperature.

An emulsion is a discontinuous population of non-coalesced small domains in a continuous phase liquid, where said domains are each out of phase from the continuous phase. Since such a population of domains will refract light from the large number of interfaces, these emulsions appear to be cloudy white. In some instances, the whole population of domains may be lighter or heavier than the continuous phase liquid, and thus will float or sink, without coalescence of the domains. In such cases, when the continuous phase liquid is clear, a small amount of clear liquid may be seen at the top or bottom of the container, with no discrete single phase change interface for the system, i.e., no main phase interface observed.

Figure 2:
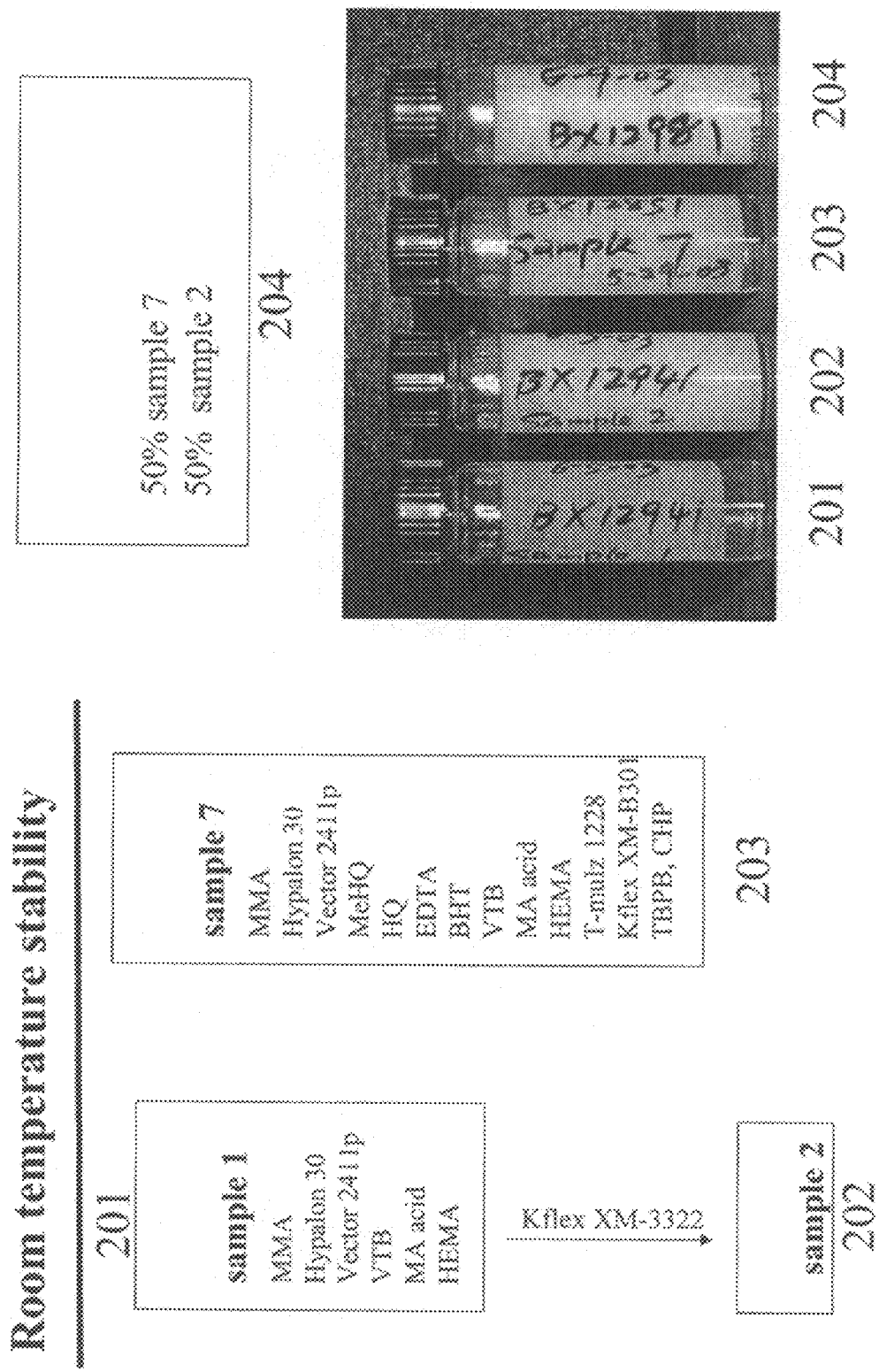

FIG. 2 is another photograph exemplifying how a urethane polyol, at room temperature, will stably emulsify elastomeric polymers that are incompatible in a (meth)acrylate component, such as methyl methacrylate. FIG. 2 shows four vials at room temperature. The first vial (201) contains methyl methacrylate, chlorosulfonated polyethylene, styrene butadiene styrene, vinyl-terminated butadiene, an organic acid, and HEMA. As noted above, chlorosulfonated polyethylene and styrene butadiene styrene are incompatible in methyl methacrylate, and chlorosulfonated polyethylene and vinyl-terminated butadiene are incompatible in methyl methacrylate. Accordingly, at least one phase interface can be seen in the first vial (201). As is further apparent in FIG. 2, addition of a urethane polyol to the first vial (201) results in a second vial (202) that contains a homogenous emulsion.

The third vial (203) depicted in FIG. 2 contains an inventive composition containing methyl methacrylate, chlorosulfonated polyethylene, styrene butadiene styrene, vinyl-terminated butadiene, a chelating agent, an organic acid, HEMA, antioxidants, free radical initiators, a phosphate ester, and a urethane polyol. Again, a stable emulsion is observed (and a very slight clear zone at the bottom of the vial indicates minor floatation of the emulsified population of domains).

The fourth vial (204) depicted in FIG. 2 contains 50 percent by weight of the inventive composition contained in the second vial (202) and 50 percent by weight of the inventive composition contained in the third vial (203). As is apparent from the fourth vial, homogenous emulsions containing elastomeric polymers that are incompatible in a (meth)acrylate component can be obtained.

Figure 3:
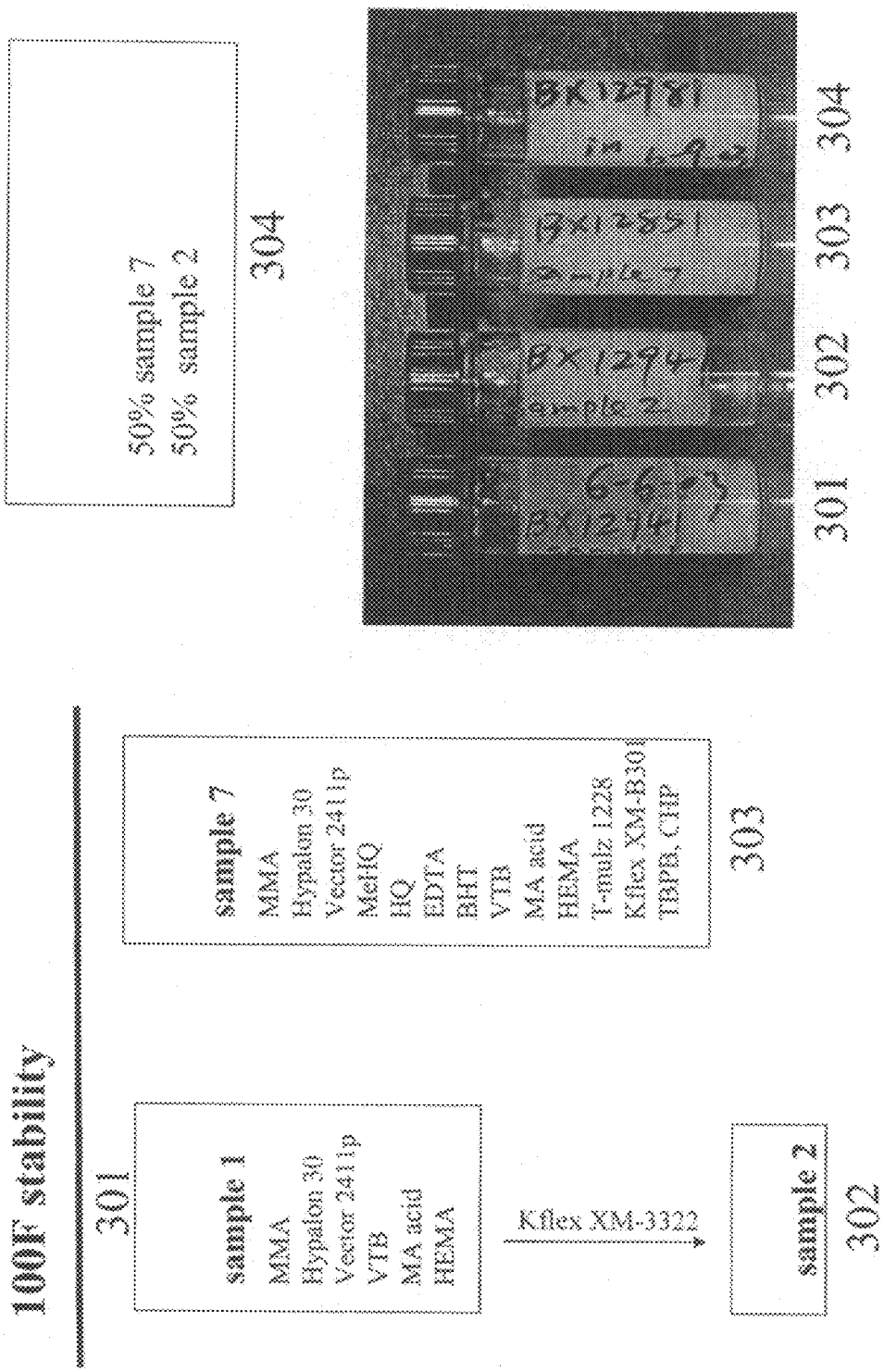
FIG. 3 is a photograph that illustrates how a urethane polyol, at 100° F., will emulsify elastomeric polymers that are incompatible in (meth)acrylate component.

FIG. 3 is a photograph exemplifying how a urethane polyol, at 100° F., will stably emulsify elastomeric polymers that are incompatible in a (meth)acrylate component, such as methyl methacrylate. FIG. 3 shows the same four compositions seen in FIG. 2, but after storage at 100° F. (photo taken at room temperature). The first vial (301) contains methyl methacrylate, chlorosulfonated polyethylene, styrene butadiene styrene, vinyl-terminated butadiene, an organic acid, and HEMA. As noted above, chlorosulfonated polyethylene and styrene butadiene styrene are incompatible in methyl methacrylate, and chlorosulfonated polyethylene and vinyl-terminated butadiene are incompatible in methyl methacrylate. Accordingly, at least one phase interface can be seen in the first vial (301). After storage at 100° F., the second vial has gone from stable (as seen in FIG. 2, #202) to separated. This shows the stabilizing effect of the hydroxy terminated urethane polyol to be less capable than the AcAc terminated urethane polyol depicted in 303 and 304.

The third vial (303) depicted in FIG. 3 contains an inventive composition containing methyl methacrylate, chlorosulfonated polyethylene, styrene butadiene styrene, vinyl-terminated butadiene, a chelating agent, an organic acid, HEMA, antioxidants, free radical initiators, a phosphate ester, and an AcAc terminated urethane polyol. As is apparent from the third vial (303) in FIG. 3, such a composition exists as a homogenous emulsion.

The fourth vial (304) depicted in FIG. 3 contains 50 percent by weight of the inventive composition contained in the second vial (302) and 50 percent by weight of the inventive composition contained in the third vial (303). As is apparent from the fourth vial, homogenous emulsions containing elastomeric polymers that are incompatible in a (meth)acrylate component can be obtained and maintained after storage at 100° F.

Figure 4:
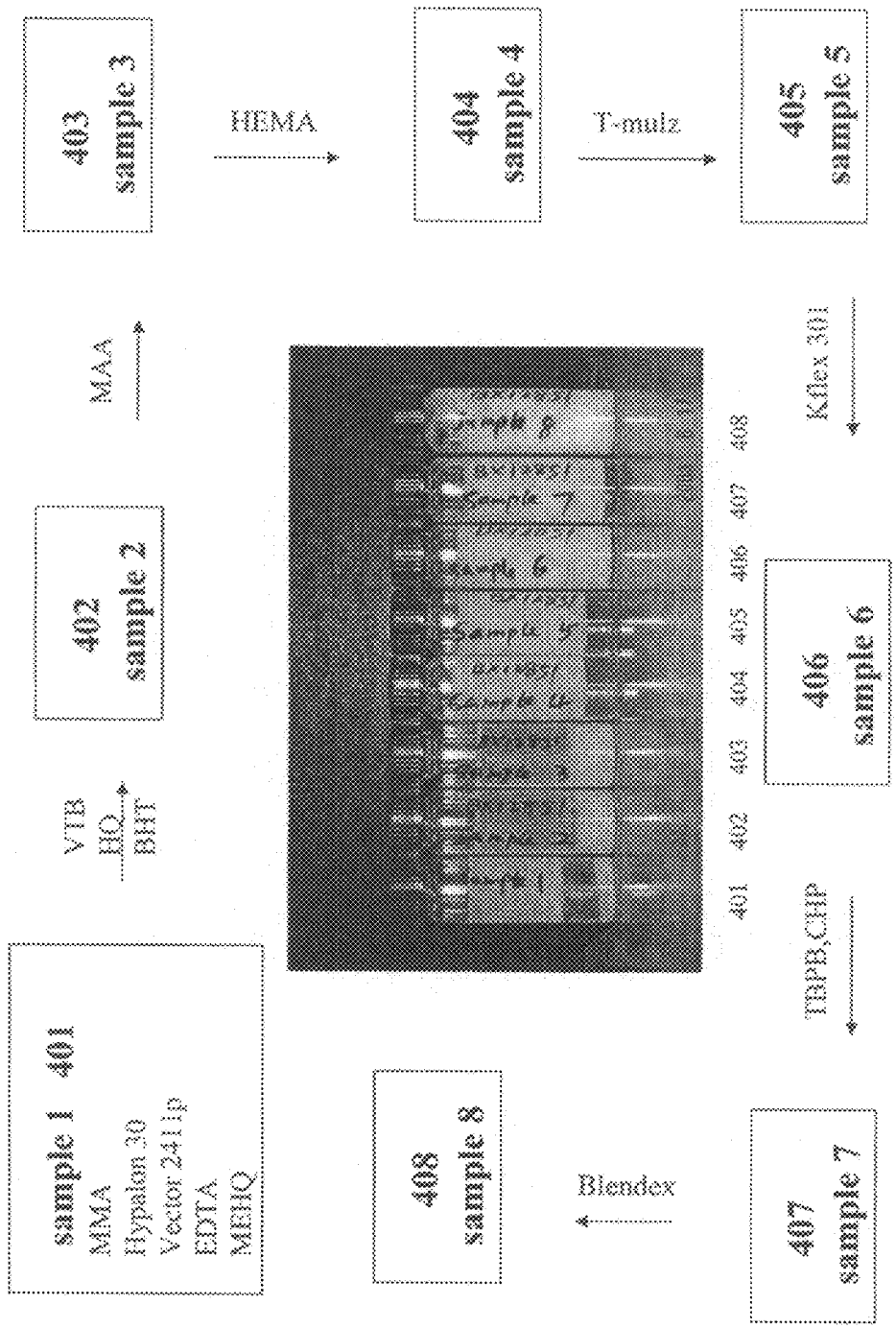
FIG. 4 is a photograph that depicts a process for making the present inventive compositions.

FIG. 4 is a photograph of eight vials labeled 401, 402, 403, 404, 405, 406, 407, and 408, respectively, and illustrates the process for making an emulsion in accordance with the present invention at room temperature. The first vial (401) contains (i) two elastomeric polymers that are incompatible in a (meth)acrylate component, namely, chlorosulfonated polyethylene and styrene butadiene styrene, and (ii) methyl methacrylate. As illustrated by the photograph, a phase interface separates a phase containing chlorosulfonated polyethylene and methyl methacrylate and a phase containing styrene butadiene styrene and methyl methacrylate. Moreover, the first vial also contains a chelating agent and an antioxidant. Vinyl-terminated butadiene and antioxidants are added to the first vial (401) to create the second vial. As shown, the second vial (402) contains a main phase interface, illustrating the fact that chlorosulfonated polyethylene and styrene butadiene styrene are incompatible in methyl methacrylate and the fact that chlorosulfonated polyethylene and vinyl-terminated butadiene are incompatible in methyl methacrylate.

Subsequently, methacrylic acid is added to the second vial (402) to create the third vial (403), HEMA is added to the third vial (403) to create the fourth vial (404), and phosphate ester is added to the fourth vial (404) to create the fifth vial (405). As is apparent from the photograph in FIG. 4, the third (403), fourth (404), and fifth (405) vials all contain a main phase interface. A urethane polyol, which acts as a stabilizer, then was added to the fifth vial (405) to create the sixth vial (406). The sixth vial (406) contains a homogenous emulsion, exemplifying how the addition of a urethane polyol can eliminate phase interfaces between elastomeric polymers that are incompatible in methyl methacrylate and result in the formation of a homogenous emulsion.

Free radical initiators are then added to the sixth vial (406) to create the seventh vial (407). An elastomeric polymer that is insoluble in methyl methacrylate (i.e., acrylonitrile butadiene styrene), then is added to the seventh vial (407) to create the eighth vial (408). As is apparent from comparing the seventh and eighth vials, acyrolonitrile butadiene styrene improved the uniformity of the emulsion depicted in vial 7 (407). Moreover, the emulsion in vial 8 (408) remained stable for at least 20 days at room temperature.

EXAMPLES

Table 1 below shows various compositions. Compositions A and B are commercially available compositions. Compositions C-E represent inventive compositions made in accordance with the present invention.

TABLE 1

Inventive Compositions C-E

| Component | Prior Art A Wt. % | Prior Art B Wt. % | C Wt. % | D Wt. % | E Wt. % |
|---|---|---|---|---|---|
| methyl methacrylate | 55.333 | 51.541 | 55.957 | 54.050 | 53.723 |
| methacrylate monomer[1] | 11.289 | — | 6.940 | 6.703 | 6.663 |
| chlorosulfonated polyethylene[2] | 9.431 | — | 5.798 | 5.600 | 5.566 |
| styrene-butadiene block copolymer[3] | — | 15.725 | 6.767 | 6.536 | 6.496 |
| vinyl-terminated butadiene[4] | — | 10.437 | 4.491 | 4.338 | 4.312 |
| acrylonitrile-butadiene-styrene[5] | 18.005 | — | 13.219 | 12.890 | 12.821 |
| acrylonitrile butadiene rubber[6] | — | 5.440 | — | — | — |
| antioxidant[7] | 0.955 | — | 0.587 | 0.567 | 0.563 |
| antioxidant[8] | 0.044 | — | 0.027 | 0.026 | 0.026 |
| chelator[9] | 0.044 | 0.090 | 0.066 | 0.063 | 0.063 |
| antioxidant[10] | — | 0.012 | 0.005 | 0.005 | 0.005 |
| methacrylic acid | 1.564 | 5.333 | 3.256 | 3.145 | 3.126 |
| phosphate ester[11] | 0.000 | 0.913 | 0.393 | 0.364 | 0.361 |
| free-radical initiator[12] | 0.885 | — | 0.544 | 0.263 | 0.262 |
| free-radical initiator[13] | — | — | — | 0.263 | 0.262 |
| accelerator[14] | 1.693 | — | 1.633 | 1.689 | 1.687 |
| free-radical initiator[15] | — | 4.273 | — | — | — |
| catalyst[16] | — | 0.463 | 0.159 | — | — |
| catalyst[17] | — | 0.463 | 0.159 | — | — |
| catalyst[18] | — | — | — | 0.0002 | 0.0002 |
| urethane polyol[19] | — | — | — | 2.727 | 2.711 |
| thixotropic agent[20] | — | — | — | — | 0.455 |
| thixotropic agent[21] | 0.545 | — | — | — | — |
| polyethylene wax-filler[22] | — | 1.045 | — | — | — |
| 30 mil glass beads | — | — | — | — | 0.452 |
| filler | — | — | — | 0.455 | — |
| wax | 0.212 | 0.420 | — | 0.318 | 0.316 |

TABLE 1-continued

Inventive Compositions C-E

| Component | Prior Art A Wt. % | Prior Art B Wt. % | C Wt. % | D Wt. % | E Wt .% |
|---|---|---|---|---|---|
| epoxy resin[23] | — | 1.909 | — | — | — |
| plasticizer[24] | — | 1.844 | — | — | — |
| color[25] | — | — | — | — | 0.023 |
| color[26] | — | — | — | — | 0.109 |
| yellow dye | — | 0.073 | — | — | — |
| blue dye | — | 0.020 | — | — | — |

[1]Mhormer BM-905, available from Rohm.
[2]Hypalon 30, available from DuPont Dow Elastomers, LLC.
[3]VECTOR 2411P, available from Dexco Copolymers, Houston, Texas.
[4]Hycar VTB (CS8610), available from BF Goodrich (now called Noveon).
[5]Blendex ® 338, available from Crompton Corp.
[6]Chemigum P83, available from Goodyear.
[7]Naugard ® BHT, available from Crompton Corp.
[8]Hydroquinone.
[9]Sodium EDTA salt.
[10]Methylether Hydroquinone.
[11]T-mulz 1228, sold by Harcros Organics, Kansas City, MO.
[12]Tertiary butyl perbenzoate.
[13]Cumene hydroperoxide.
[14]Pyridine derivative sold under tradename REILLCAT ASY-2, manufactured by Reilly Industries, Inc.
[15]Benzoyl peroxide and dibutylthalate paste sold under tradename Varox ANS, manufactured by R.T. Vanderbilt Co., Inc.
[16]Dimethyl p-toluidene (DMT).
[17]TMD (or HEPT) N,N-bis-hydroxyethyl p-toluidine, sold by Eastman.
[18]Copper naphthenate in methyl methacrylate.
[19]K-flex XM-B301 sold by King Industries, Norfolk, CT.
[20]Disparlon 6100 sold by King Industries, Norfolk, CT.
[21]Disparlon 6200 sold by King Industries, Nortfolk, CT.
[22]Econopoly 2 N1 sold by Lawter International.
[23]Epon ® 828 sold by The Shell Chemical Company.
[24]Benzoflex 2088 sold by Velsicol Co.
[25]Carbon black in plasticizer.
[26]White titanium dioxide in plasticizer.

Structural adhesives are now being planned for use in vehicles and large structures that must not only hold the structure together, but also must be of extraordinary toughness, even "crashworthiness". The examples set forth below will demonstrate the ability of the inventive compositions to maintain high values for strength, peel, and impact at cold temperatures simultaneously, compared to prior art compositions. More rigid adhesives give higher tensile lap strengths at room temperature and high temperature, at the sacrifice of peel strength and cold temperature impact. These inventive compositions have maintained a balance of "high property values." A benchmark for high performance can be comprised of the following minimum values:

| BENCH MARK | |
|---|---|
| Tensile lap shear strength: | >2400 psi at ~25° C. |
| Tensile lap shear strength: | >550 psi at ~105° C. |
| Peel Strength: | >60 pli at ~25° C. |
| Charpy Impact: | >15 KJ/sq meter at −40 ° C. |

Example 1

This example demonstrates the superior tensile peel strength of the inventive adhesive compositions on acid-etched aluminum.

Compositions A, B, C, and D were prepared in accordance with Table 1. Compositions A and B are typical of commercial products. Compositions C and D are inventive compositions. As set forth in Table 1, inventive compositions C and D each contain a stable emulsion of three different elastomeric polymers that are soluble and/or partially soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein.

The tensile peel strength of prior art compositions A and B and inventive compositions C and D was determined using a floating roller peel test. Specifically, the tensile strength of the aforementioned compositions was tested on acid-etched aluminum in accordance with American Standard Test Measurement (ASTM) D3167 at a crosshead speed of two inches per minute and at a temperature of 77° F. Samples were cured 2 hours at ~25° C., and 30 minutes at 220° F. The results of the floating roller peel test are shown in Table 2.

TABLE 2

Tensile Peel Strength of Prior Art Compositions A and B and Inventive Compositions C and D on Acid Etched Aluminum

| | Prior Art Composition A | Prior Art Composition B | Composition C | Composition D |
|---|---|---|---|---|
| Tensile Peel Strength (pli) | 56 | 81 | 100 | 93 |

Inventive compositions C and D both exhibited an extraordinarily high tensile peel strength that is greater than the peel strength of each of the tested prior art adhesive compositions. As shown in Table 2, inventive composition C exhibited a tensile peel strength that is almost two times the tensile peel strength of prior art composition A and about 1.2 times the tensile strength of prior art composition B. Moreover, as further shown in Table 2, inventive composition D exhibited a tensile peel strength that is greater than 1.6 times the tensile strength of prior art composition A and about 1.1 times the tensile strength of prior art composition B.

Example 2

This example demonstrates the superior tensile peel strength of the inventive adhesive compositions on urethane-primed galvanized steel as compared to adhesive compositions known in the art.

Compositions A, B, C, D, and E were prepared in accordance with Table 1. Compositions A and B are typical of commercially available products. Compositions C, D, and E are inventive compositions. As set forth in Table 1, inventive compositions C, D, and E each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Compositions D and E also contain a urethane polyol.

The tensile peel strength of prior art compositions A and B and inventive compositions C, D, and E was tested on galvanized steel substrates that were coated with zinc phosphate and top-coated with a 0.003" thick urethane primer (commercially available from BASF Corporation) using a T-peel test. Specifically, the tensile peel strength of the aforementioned compositions was tested on urethane primed coupons in accordance with American Standard Test Measurement (ASTM) D1876. All compositions were cured by an accelerated schedule (2 hours at room temperature (~25° C.)), or a non-accelerated schedule (1 to 3 days at room temperature (~25° C.)). The results of the T-peel test are shown in Table 3.

TABLE 3

Tensile Peel Strength of Prior Art Compositions A and B and Inventive Compositions C, D, and E on Urethane-Coated Galvanized Steel

| | Prior Art Composition A | Prior Art Composition B | Inventive Composition C | Inventive Composition D | Inventive Composition E |
|---|---|---|---|---|---|
| Tensile Peel Strength (pli) | 52 | ~57 | 65-75 | 75-105 | 75-115 |

As is apparent from Table 3, inventive compositions C, D, and E each exhibited a tensile peel strength that is greater than the peel strength of each of the tested prior art adhesive compositions. Significantly, inventive composition D exhibited a tensile peel strength from about 1.5 to about 2 times the tensile peel strength of prior art composition A and from about 1.3 to about 1.8 times the tensile peel strength of prior art composition B. Moreover, inventive composition E exhibited a tensile peel strength from about 1.4 to about 2.2 times the tensile peel strength of prior art composition A and from about 1.3 to about 2.0 times the tensile peel strength of prior art composition B.

Example 3

This example demonstrates the superior ability of the present inventive compositions to bond to steel, while maintaining very high peel strength.

Compositions A, C, D, and E were prepared in accordance with Table 1. Composition A is typical of commercially available prior art adhesive compositions. Compositions C, D, and E are inventive compositions. As set forth in Table 1, compositions C, D, and E each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein.

Lap shear specimens were prepared for composition A, which served as a comparative prior art composition, and for inventive compositions C, D, and E using steel substrates. The specimens had a inch by 1 inch overlap and 0.030 inch bond line gap.

The specimens were cured for two hours at room temperature and then for 30 minutes at 220° F. The specimens were then cooled to 72° F. Tensile lap strengths (TLS) were measured at 72° F. and 220° F. The specimens were pulled at 0.5 inches/minute using an Instron testing machine in accordance with American Standard Test Measurement (ASTM) D1002. The results of the aforementioned measurements are shown in Table 4.

TABLE 4

Tensile Lap Strength of Prior Art Compositions A and B and Inventive Compositions C, D, and E Applied to Galvanized Steel at 0.030" Gap

| | Prior Art Composition A | Prior Art Composition B | Inventive Composition C | Inventive Composition D | Inventive Composition E |
|---|---|---|---|---|---|
| Tensile Lap Strength (psi) at 72° F. | 3665 | 2725 | 2567 | 2785 | 3029 |
| Tensile Lap Strength (psi) at 220° F. | 1396 | 434 | 912 | 818 | - |

As is apparent from Table 4, inventive compositions D and E exhibited a high tensile strength that was greater than the tensile strength of prior art composition B at 72° F., and inventive compositions C and D exhibited greater tensile strength than prior art composition B at 220° F. All the inventive compositions are above the benchmark minimum set forth above.

Example 4

This example demonstrates the ability of the present inventive compositions to bond to urethane-primed galvanized steel at 72° F. and 220° F., while maintaining high peel strength, and high impact performance at −40° F.

Compositions A, C, D, and E were prepared in accordance with Table 1. Composition A is typical of commercially available adhesive compositions. Compositions C, D, and E are inventive compositions. As set forth in Table 1, compositions C, D, and E each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein.

Lap shear specimens were prepared for composition A, which served as a comparative prior art composition and for inventive compositions C, D, and E using galvanized steel substrates that were coated with zinc phosphate and topcoated with a 0.003" thick urethane primer (commercially available from BASF Corporation). The specimens had a ½ inch by 1 inch overlap and 0.30 inch bond line gap.

The specimens were cured for two hours at room temperature and then for 30 minutes at 220° F. The specimens were then cooled to 72° F. Tensile lap strengths (TLS) were measured at 72° F. and 220° F. The specimens were pulled at 0.5 inches/minute using an Instron testing machine in accordance with American Standard Test Measurement (ASTM) D1002. The results of the aforementioned measurements are shown in Table 5.

meric polymer that is not soluble in methacrylate (i.e., acrylonitrile butadiene styrene) stably dispersed therein. Inventive compositions D and E also contain a urethane polyol.

Impact tests were performed on steel substrates. The impact tests were performed using a General Motors certified Charpy side impact tester in accordance with side impact test GM 9751P at −40° F. The results of the impact test are shown in Table 6.

TABLE 5

Tensile Lap Strength of Prior Art Compositions A and B and Inventive Compositions C, D, and E Applied to Urethane-Primed Galvanized Steel at 0.030" Gap

| | Prior Art Composition A | Prior Art Composition B | Inventive Composition C | Inventive Composition D | Inventive Composition E |
|---|---|---|---|---|---|
| Tensile Lap Strength (psi) at 72° F. | 2231 | - | 2520 | 2700-3000 | 2400-3100 |
| Tensile Lap Strength (psi) at 220° F. | 1132 | 322 | 770 | 600-1000 | 600-1000 |

As is apparent from Table 5, all of the tested inventive compositions exhibited a tensile strength greater than the tensile strength of prior art composition A at 72° F. In particular, while prior art composition A only exhibited a tensile strength of 2231 psi at 72° F., all of the tested inventive compositions exhibited a tensile strength of at least 2400 psi, with inventive composition D exhibiting a tensile strength of from about 2700 psi to about 3000 psi and with inventive composition E exhibiting a tensile strength of from about 2400 psi to about 3100 psi. Moreover, all of the tested inventive compositions exhibited significantly greater tensile strength than prior art composition B at 72° F. Again, all the inventive compositions are above the Bench Mark set forth above.

Example 5

This example demonstrates the exceptional impact strength of the present inventive compositions on steel, while high tensile lap shear strength was maintained at 25° C. and 105° C.

Compositions A, B, C, D, and E were prepared in accordance with Table 1. Compositions A and B are typical of commercially available adhesives. Compositions C, D, and E are inventive compositions. As set forth in Table 1, inventive compositions C, D, and E each contain a stable emulsion of three different elastomeric polymers that are soluble in methacrylate (i.e., chlorosulfonated polyethylene, styrene butadiene styrene, and vinyl terminated butadiene) with an elasto-

TABLE 6

Impact Strength of Prior Art Compositions A and B and Inventive Compositions C, D, and E on Steel

| | Prior Art Composition A | Prior Art Composition B | Inventive Composition C | Inventive Composition D | Inventive Composition E |
|---|---|---|---|---|---|
| Impact Strength (KJ/m²) | 8.9 | ≧29.0 | 20.8 | 27.3 | 26.6 |

As is apparent from Table 6, inventive compositions C, D, and E all exhibited an impact strength greater than the impact strength of prior art composition A. In particular, inventive compositions C, D, and E each exhibited an impact strength that is at least two times the impact strength of prior art composition A. Although composition B meets the Bench Mark for impact here, it fails the Bench Mark for tensile lap shear strength at 105° C.

Example 6

This example demonstrates the exceptional impact strength of the present inventive compositions on urethane-primed galvanized steel, while maintaining high tensile lap shear strength at ~25° C. and 105° C.

Compositions A, B, C, D, and E were prepared in accordance with Table 1. Compositions A and B are typical of commercially available adhesives. Compositions C, D, and E are inventive compositions. As set forth in Table 1, inventive compositions C, D, and E each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein.

Inventive compositions D and E also contain a urethane polyol.

Impact tests were performed on galvanized steel substrates that were coated with zinc phosphate and top-coated with a 0.003" thick urethane primer (commercially available from BASF Corporation). The impact tests were performed using a General Motors certified Charpy side impact tester in accordance with side impact test GM 9751P at −40° F. The results of the impact test are shown in Table 7.

TABLE 7

Impact Strength of Prior Art Compositions A and B and Inventive Compositions C, D, and E on Urethane-Primed Galvanized Steel

| | Prior Art Composition A | Prior Art Composition B | Inventive Composition C | Inventive Composition D | Inventive Composition E |
|---|---|---|---|---|---|
| Impact Strength (KJ/m$^2$) | 8.6 | 19.4 | ≧29.0 | ≧29.0 | ≧29.0 |

As is apparent from Table 7, inventive compositions C, D, and E all exhibited a greater impact strength than prior art compositions A and B. In particular, inventive compositions C, D, and E each exhibited an impact strength that is more than three times the impact strength of prior art composition A and an impact strength that is about one and a half times the impact strength of prior art composition B.

Example 7

This example demonstrates the superior ability of urethane-primed galvanized steel bonded with the present inventive compositions to withstand impact from a falling weight i.e., "hits" before yielding.

Compositions A, C, D, and E were prepared in accordance with Table 1. Composition A is typical of commercially available adhesives. Compositions C, D, and E are inventive compositions. As set forth in Table 1, inventive compositions C, D, and E each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions D and E also contain a urethane polyol.

prop tests were performed in accordance with an in-house test method, where a weight is dropped onto a bonded panel with sufficient force to cut through the metal itself when bolted-in on either side of the impact area. The virgin metal stock, in ready use condition, is then cut, overlapped, and bonded on either side of the impact area. The test is run at several conditions: at room temperature, at −40° F., and at 220° F. (105° C.). The results of the drop tests are shown in Table 8.

TABLE 8

Ability of Inventive Compositions C, D, and E to Withstand Hits

| | Prior Art Composition A | Prior Art Composition B* | Inventive Composition C | Inventive Composition D | Inventive Composition E |
|---|---|---|---|---|---|
| Room Temperature | 0-1 hit | - | 3 hits | 2-3 hits | 2-4 hits |
| −40° F. | 0-1 hit | - | 2 hits | 2-3 hits | 2-4 hits |
| 220° F. | 0-1 hit | - | 3 hits | 2-3 hits | 2-4 hits |

*Prior art composition B, which is set forth in Table 1, was not tested due to insufficient strength at 220° F.

As is apparent from Table 8, while prior art composition A could only withstand, at most, one hit, before yielding, all of the inventive compositions were able to withstand at least 2 hits. Significantly, inventive composition D was able to withstand 2-3 hits at all temperatures tested and inventive composition E was able to withstand 2-4 hits at all temperatures tested.

TABLE 9

Inventive Compositions F-I
Table 9 below shows various compositions.
Specifically, compositions F-I are additional inventive compositions made in accordance with the present invention.

| Component | Inventive Composition F Wt. % | Inventive Composition G Wt. % | Inventive Composition H Wt. % | Inventive Composition I Wt. % |
|---|---|---|---|---|
| methyl methacrylate | 55.561 | 54.050 | 54.050 | 54.050 |
| methacrylate monomer[27] | 6.891 | 6.703 | 6.703 | 6.703 |
| chlorosulfonated polyethylene[28] | 5.757 | 5.600 | 5.600 | 5.600 |
| styrene-butadiene block copolymer[29] | 6.719 | 6.536 | 6.536 | 6.536 |
| vinyl-terminated butadiene[30] | 4.460 | 4.338 | 4.338 | 4.338 |
| acrylonitrile-butadiene-styrene terpolymer[31] | 13.252 | 12.890 | 12.890 | 12.890 |
| antioxidant[32] | 0.583 | 0.567 | 0.567 | 0.567 |
| antioxidant[33] | 0.027 | 0.026 | 0.026 | 0.026 |
| chelator[34] | 0.065 | 0.063 | 0.063 | 0.063 |
| antioxidant[35] | 0.005 | 0.005 | 0.005 | 0.005 |
| organic acid[36] | 3.233 | 3.145 | 3.145 | 3.145 |
| phosphate ester[37] | 0.374 | 0.364 | 0.364 | 0.364 |
| free-radical initiator[38] | 0.271 | 0.263 | 0.263 | 0.263 |
| free radical initiator[39] | 0.271 | 0.263 | 0.263 | 0.263 |
| accelerator[40] | 1.737 | 1.689 | 1.689 | 1.689 |
| catalyse[41] | 0.0002 | 0.0002 | 0.0002 | 0.0002 |
| filler | 0.467 | 0.455 | 0.455 | 0.455 |
| wax | 0.327 | 0.318 | 0.318 | 0.318 |
| AcAc ester capped urethane polyol[42] | - | 2.727 | - | - |

TABLE 9-continued

Inventive Compositions F-I
Table 9 below shows various compositions.
Specifically, compositions F-I are additional
inventive compositions made in
accordance with the present invention.

| Component | Inventive Composition F Wt. % | Inventive Composition G Wt. % | Inventive Composition H Wt. % | Inventive Composition I Wt. % |
|---|---|---|---|---|
| AcAc ester capped non-urethane polyol[43] | - | - | 2.727 | - |
| hydroxy capped urethane polyol[44] | - | - | - | 2.727 |
| Total Percentage | 100.00 | 100.00 | 100.00 | 100.00 |

[27]Mhormer BM-905, available from Rohm.
[28]Hypalon 30, available from DuPont Dow Elastomers, LLC.
[29]VECTOR 2411P, available from Dexco Copolymers, Houston, Texas.
[30]Hycar VTB (CS8610), available from BF Goodrich (now called Noveon).
[31]Blendex ® 338, available from Crompton Corp.
[32]Naugard ® BHT, available from Crompton Corp.
[33]Hydroquinone.
[34]Sodium EDTA salt.
[35]Methylether Hydroquinone.
[36]Methacrylic Acid.
[37]T-mulz 1228, sold by Harcros Organics, Kansas City, MO.
[38]Tertiary butyl perbenzoate.
[39]Cumene hydroperoxide.
[40]Pyridine derivative sold under tradename REILLCAT ASY-2, manufactured by Reilly Industries Inc.
[41]Copper naphthenate in methyl methacrylate.
[42]K-flex XM-B301, available from by King Industries, Norfolk, CT.
[43]Chempol 211-9038, available from CCP Corp.
[44]K-flex XM 3322, available from King Industries, Norfolk, CT.

Example 8

This example demonstrates the long open time of the present inventive compositions. Compositions F, G, H, and I were prepared in accordance with Table 9. Compositions F, G, H, and I are inventive compositions. As set forth in Table 9, inventive compositions F, G, H, and I each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions G, H, and I also contain a urethane polyol.

Open time was measured in accordance with the time before which the mixed adhesive could no longer wet out new substrate. The results are shown in Table 10.

TABLE 10

Open Time of Inventive Compositions F-I

| | Inventive Composition F | Inventive Composition G | Inventive Composition H | Inventive Composition I |
|---|---|---|---|---|
| open time (minutes) | 13-15 | 16-18 | 16-18 | 16-18 |

As is apparent from Table 10, the inventive compositions without AcAc ester or urethane polyol exhibited an open time of 13 to 15 minutes, whereas the inventive compositions G, H, and I, containing AcAc ester or urethane polyol, exhibited an open time of 16 to 18 minutes (a 20% increase or more).

Example 9

This example demonstrates the peak exotherm time of the present inventive compositions. Compositions F, G, H, and I were prepared in accordance with Table 9. Compositions F, G, H, and I are inventive compositions. As set forth in Table 9, inventive compositions F, G, H, and I each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions G, H, and I also contain a urethane polyol.

Peak exotherm time was measured in accordance with a thermocouple immersed into the center of a 20 gram mass of mixed adhesive. The results are shown in Table 11.

TABLE 11

Peak Exotherm Time of Inventive Compositions F-I

| | Inventive Composition F | Inventive Composition G | Inventive Composition H | Inventive Composition I |
|---|---|---|---|---|
| peak exotherm time | 22 min 40 sec | 27 min | 29 min 20 sec | 28 min 30 sec |

As is apparent from Table 11, all of the inventive compositions exhibited a peak exotherm time of at least 22 minutes, with inventive compositions G, H, and I, containing AcAc ester or urethane polyol, exhibiting a peak exotherm time of at least 27 minutes.

Example 10

This example demonstrates the hardening time of beads in the present inventive compositions. Compositions F, G, H, and I were prepared in accordance with Table 9. Compositions F, G, H, and I are inventive compositions. As set forth in Table 9, inventive compositions F, G, H, and I each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions G, H, and I also contain a urethane polyol.

Bead hardening time was measured in accordance with qualitative probing of the bead with a wooden stick. The results are shown in Table 12.

TABLE 12

Hardening Time of Beads in Inventive Compositions F-I

| | Inventive Composition F | Inventive Composition G | Inventive Composition H | Inventive Composition I |
|---|---|---|---|---|
| hardening time (minutes) | 43-47 | 55-60 | 58-63 | 54-58 |

As is apparent from Table 12, all of the inventive compositions exhibited a bead hardening time of at least 43 minutes, with compositions G, H, and I all exhibiting a bead hardening time of at least 54 minutes. These results further corroborate the use of AcAc ester and/or urethane polyol to achieve open time extension.

Example 11

This example demonstrates the superior ability of the present inventive compositions, particularly inventive compositions containing a urethane polyol, to rapidly develop strength to steel after curing for only ninety minutes at 72° F.

Compositions F, G, H, and I were prepared in accordance with Table 9. Compositions F, G, H, and I are inventive compositions. As set forth in Table 9, inventive compositions F, G, H, and I each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions G, H, and I also contain a urethane polyol.

Lap shear specimens were prepared for inventive compositions F, G, H, and I using galvanized steel substrates. The specimens had a ½ inch by 1 inch overlap and 0.30 inch bond line gap.

The specimens were cured for 90 minutes at 72° F. Tensile lap strengths (TLS) were measured at 72° F. The specimens were pulled at 0.5 inches/minute using an Instron testing machine in accordance with American Standard Test Measurement (ASTM) D1002. The results of the aforementioned measurements are shown in Table 13.

TABLE 13

Tensile Lap Strength Development after only 90 minutes, of Inventive Compositions F, G, H, and I Applied to Steel at 0.030" Gap

|  | Inventive Composition F | Inventive Composition G | Inventive Composition H | Inventive Composition I |
|---|---|---|---|---|
| Tensile Lap Strength (psi) at 72° F. | 311 | 869 | 538 | 718 |

As is apparent from Table 13, the inventive compositions including a urethane polyol all exhibited a tensile lap strength that was significantly greater than the tensile lap strength of an inventive composition not containing a urethane polyol. In particular, inventive compositions G and I, which contained a urethane polyol, each exhibited a tensile lap strength that is at least two times greater than the strength of a comparative inventive composition not containing a urethane polyol (namely, inventive composition F) in the same short time frame.

Example 12

This example further demonstrates the tensile peel strength of the inventive adhesive compositions on urethane-primed galvanized steel as compared to adhesive compositions known in the art.

Compositions F, G, H, and I were prepared in accordance with Table 9. Compositions F, G, H, and I are inventive compositions. As set forth in Table 9, inventive compositions F, G, H, and I each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions G, H, and I also contain a urethane polyol.

The tensile peel strength of inventive compositions F, G, H, and I was tested on galvanized steel substrates that were coated with zinc phosphate and top-coated with a 0.003" thick urethane primer (commercially available from BASF Corporation) using a T-peel test. Specifically, the tensile strength of the aforementioned compositions was tested on etched aluminum in accordance with American Standard Test Measurement (ASTM) D1876. The adhesives were cured 2 hours at ~25° C., followed by 30 minutes at 220° F., then cooled to ~25° C. The results of the T-peel test are shown in Table 14.

TABLE 14

Tensile Peel Strength of Prior Art Compositions F, G, H, and I on Urethane-Coated Galvanized Steel

|  | Inventive Composition F | Inventive Composition G | Inventive Composition H | Inventive Composition I |
|---|---|---|---|---|
| Tensile Peel Strength (pli) | 95 | 86 | 86 | 94 |

As is apparent from Table 14, inventive compositions F, G, H, and I each exhibited a tensile peel strength of at least 86 pli, with inventive composition F exhibiting a tensile peel strength of 95 and inventive composition I exhibiting a tensile peel strength of 94. By comparison, prior art composition A only pulls 52 pli, and composition B only 57 pli on the same substrate, and under the same conditions.

Example 13

This example further demonstrates impact strength of the present inventive compositions on galvanized steel.

Compositions F, G, H, and I were prepared in accordance with Table 9. Compositions F, G, H, and I are inventive compositions. As set forth in Table 9, inventive compositions F, G, H, and I each contain a stable emulsion of three different elastomeric polymers that are soluble in methacrylate (i.e., chlorosulfonated polyethylene, styrene butadiene styrene, and vinyl terminated butadiene) with an elastomeric polymer that is not soluble in methacrylate (i.e., acrylonitrile butadiene styrene) stably dispersed therein. Inventive compositions G, H, and I also contain a urethane polyol.

Impact tests were performed on steel substrates. The impact tests were performed using a General Motors certified Charpy side impact tester in accordance with side impact test GM 9751P at −40° F. The results of the impact test are shown in Table 15.

TABLE 15

Impact Strength of Inventive Compositions F, G, H, and I on Steel

|  | Inventive Composition F | Inventive Composition G | Inventive Composition H | Inventive Composition I |
|---|---|---|---|---|
| Impact Strength (KJ/m$^2$) | 19.4 | 19.4 | 17.9 | 17.4 |

As is apparent from Table 15, inventive compositions F, G, H, and I all exhibited an impact strength of at least 17.4 KJ/m$^2$, with inventive compositions F and G exhibiting an impact strength of at least 19.4 KJ/m$^2$. All are above the Bench Mark cited above.

What is claimed is:

1. An adhesive composition comprising a stable, homogenous emulsion comprising:
    (a) at least one curable (meth)acrylate component;
    (b) at least three different elastomeric polymers that are soluble in the (meth)acrylate component;
    (c) at least one elastomeric polymer that is not soluble in the (meth)acrylate component; and
    (d) a urethane polyol, wherein the urethane polyol results in the formation of the stable, homogenous emulsion;
    and wherein said emulsion remains stable and homogenous for at least 20 days at room temperature.

2. The composition of claim 1, wherein the (meth)acrylate component is present in an amount from about 40 percent by weight to about 75 percent by weight of the total composition.

3. The composition of claim 1, wherein the at least three different elastomeric polymers that are soluble in the (meth)acrylate component are present in an amount from about 5 percent by weight to about 60 percent by weight of the total composition.

4. The composition of claim 1, wherein the first different elastomeric polymer that is soluble in the (meth)acrylate component is present in an amount from about 1 percent by weight to about 30 percent by weight of the total composition.

5. The composition of claim 1, wherein the second different elastomeric polymer that is soluble in the (meth)acrylate component is present in an amount from about 1 percent by weight to about 30 percent by weight of the total composition.

6. The composition of claim 1, wherein the third different elastomeric polymer that is soluble in the (meth)acrylate component is present in an amount from about 1 percent by weight to about 30 percent by weight of the total composition.

7. The composition of claim 1, wherein the at least one elastomeric polymer that is not soluble in the (meth)acrylate component is present in an amount of about 50 or less percent by weight of the total composition.

8. The composition of claim 1, wherein the at least three different elastomeric polymers that are soluble in the (meth)acrylate component are selected from the group consisting of rubber and/or rubber copolymers and/or rubber derivatives (both saturated and unsaturated).

9. The composition of claim 8, wherein the at least three different elastomeric polymers are styrene butadiene styrene, vinyl-terminated butadiene, and chlorosulfonated polyethylene.

10. The composition of claim 1, wherein the at least one elastomeric polymer that is not soluble in the (meth)acrylate component and/or its solutions in all proportions is selected from the group consisting of rubber and/or rubber copolymers and/or rubber derivatives (both saturated and unsaturated).

11. The composition of claim 10, wherein the at least one elastomeric polymer that is not soluble in the (meth)acrylate component and/or its solutions in all proportions is acrylonitrile butadiene styrene.

12. The composition of claim 1, wherein the portion of the at least one elastomeric polymer that is not soluble in the (meth)acrylate component is stably dispersed in the emulsion.

13. The composition of claim 1, wherein the composition further includes an acetyl acetonate ester capped urethane polyol.

14. The composition of claim 1, wherein the composition further comprises a free-radical initiator component.

15. The composition of claim 1, wherein the composition yields one or more of a peel strength on acid-etched aluminum of at least 90 pli at room temperature, wherein the composition is cured for two hours at room temperature and then for 30 minutes at 220° F. and then cooled to room temperature prior to measuring the peel strength; a tensile strength on a substrate of at least 2400 psi at 72° F., wherein the composition is cured for two hours at room temperature and then for 30 minutes at 220° F. and then cooled to 72° F. prior to measuring the tensile strength; upon cure on a substrate, withstands an impact of at least 15 KJ/m$^2$ when measured at −40° F.; yields a peel strength on a substrate of at least 65 pli at room temperature, wherein the composition is cured for two hours at room temperature and then for 30 minutes at 220° F. and then cooled to room temperature prior to measuring the peel strength.

16. A method for using a composition of claim 1 to bond together two substrates, comprising the steps of:
    (a) applying the composition of claim 1 to a first substrate surface;
    (b) mating the surface of a second substrate in abutting relationship with composition-applied first substrate surface to form an assembly; and
    (c) maintaining the abutting relationship for a time sufficient to allow the composition to cure.

17. A composition comprising the reaction product of:
    (a) a first part comprising:
        (i) at least one curable (meth)acrylate component;
        (ii) at least three different elastomeric polymers that are soluble in the (meth)acrylate component; and
        (iii) a urethane polyol; and
    (b) a second part optionally comprising at least one elastomeric polymer that is not soluble in the (meth)acrylate component;
    wherein the urethane polyol results in the formation of a stable, homogenous emulsion; and wherein said emulsion remains stable and homogenous for at least 20 days at room temperature.

* * * * *